(12) United States Patent
Kim

(10) Patent No.: US 7,421,979 B2
(45) Date of Patent: Sep. 9, 2008

(54) ELECTRONIC FENCE CAPABLE OF GUIDING ANIMALS TO RETURN

(75) Inventor: Joon S. Kim, Dallas, TX (US)

(73) Assignee: DT Systems, Inc., Dallas, TX (US)

( * ) Notice: Subject to any disclaimer, the term of this patent is extended or adjusted under 35 U.S.C. 154(b) by 162 days.

(21) Appl. No.: 11/261,043

(22) Filed: Oct. 28, 2005

(65) Prior Publication Data

US 2006/0102101 A1 May 18, 2006

(30) Foreign Application Priority Data

Oct. 30, 2004 (KR) .................. 10-2004-0087608

(51) Int. Cl.
*A01K 15/02* (2006.01)
*A01K 15/04* (2006.01)
*G08B 23/00* (2006.01)

(52) U.S. Cl. .............. 119/721; 119/720; 119/719; 119/712; 340/573.1; 340/573.3

(58) Field of Classification Search ......... 119/720, 119/721, 859; 340/573.1, 573.3; 455/128, 455/42.1, 127.1
See application file for complete search history.

(56) References Cited

U.S. PATENT DOCUMENTS

| | | | | |
|---|---|---|---|---|
| 4,745,882 A | | 5/1988 | Yarnall, Sr. et al. | |
| 4,967,695 A | * | 11/1990 | Giunta | 119/721 |
| 5,067,441 A | * | 11/1991 | Weinstein | 119/721 |
| 5,099,797 A | * | 3/1992 | Gonda | 119/720 |
| 5,170,149 A | | 12/1992 | Yarnall, Sr. et al. | |
| 5,207,179 A | * | 5/1993 | Arthur et al. | 119/721 |
| 5,241,923 A | * | 9/1993 | Janning | 119/721 |
| 5,425,330 A | * | 6/1995 | Touchton et al. | 119/721 |
| 5,438,319 A | * | 8/1995 | Zeytoonjian et al. | 340/571 |
| 5,794,569 A | | 8/1998 | Titus et al. | |
| 5,844,489 A | * | 12/1998 | Yarnall et al. | 340/573.3 |
| 5,857,433 A | * | 1/1999 | Files | 119/720 |
| 5,868,103 A | * | 2/1999 | Boyd | 119/719 |
| 6,019,066 A | * | 2/2000 | Taylor | 119/720 |
| 6,073,589 A | * | 6/2000 | Curen et al. | 119/720 |
| 6,079,367 A | * | 6/2000 | Stapelfeld et al. | 119/720 |
| 6,095,092 A | | 8/2000 | Chou | |
| 6,166,643 A | * | 12/2000 | Janning et al. | 340/573.3 |
| 6,167,843 B1 | * | 1/2001 | Kim | 119/720 |

(Continued)

*Primary Examiner*—Peter M. Poon
*Assistant Examiner*—Kristen C Hayes
(74) *Attorney, Agent, or Firm*—Garlick Harrison & Markison; James A. Harrison

(57) ABSTRACT

An electronic fence system capable of guiding animals under training to return to a predetermined restricted area. The electronic fence generates electric shocks as the animals attempt to leave the predetermined restricted area and restrains the electrical shock when the animals return to the predetermined restricted area. The electronic fence includes a transmitter and a receiver. The transmitter transmits RF signals having a plurality of control signals such that different shock levels are generated responsive to the location of the animals within the predetermined restricted area. The receiver sets a shock wave level, selectively controls the generation of the electric shock and a high-frequency beep, automatically restrains the generation of the electric shock when an escaped animal returns to the predetermined restricted area, and generates an audible alarm and turns lamps on and off to indicate the location of the animal when it escapes from the predefined restricted area.

17 Claims, 5 Drawing Sheets

Transmitter

Receiver

U.S. PATENT DOCUMENTS

| | | | |
|---|---|---|---|
| 6,415,742 B1* | 7/2002 | Lee et al. | 119/721 |
| 6,598,563 B2* | 7/2003 | Kim et al. | 119/720 |
| 6,825,768 B2* | 11/2004 | Stapelfeld et al. | 340/573.3 |
| 2002/0040689 A1* | 4/2002 | So | 119/720 |
| 2003/0034893 A1* | 2/2003 | Stapelfeld et al. | 340/573.3 |
| 2003/0116101 A1* | 6/2003 | Kim et al. | 119/720 |
| 2003/0121480 A1* | 7/2003 | Grimsley et al. | 119/721 |
| 2005/0120978 A1* | 6/2005 | Lalor | 119/721 |
| 2005/0217606 A1* | 10/2005 | Lee et al. | 119/720 |

* cited by examiner

Conventional electronic fence

Transmitter

Receiver

Transmitter block diagram

Receiver block diagram

ELECTRONIC FENCE CAPABLE OF GUIDING ANIMALS TO RETURN

CROSS REFERENCE TO RELATED PATENTS

This application claims priority to Korean Patent Application Serial No. 10-2004-0087608, filed Oct. 30, 2004, under 35 U.S.C. 119 which is incorporated herein by reference in its entirety for all purposes.

BACKGROUND OF THE INVENTION

1. Technical Field of the Invention

The present invention relates to an electronic fence, and more particularly, to an electronic fence capable of guiding animals under training to return to a predetermined restricted area.

2. Description of the Related Art

FIG. 1 shows a conventional electronic fence. In FIG. 1, transmitter 100 is connected to a transmission wire antenna 110 for transmitting an electric wave. Transmitter 100 includes an electric shock level control 101 for setting the level of an electric shock to be applied to animals, an antenna checking lamp 102, a power switch 103, and a transmitter power level control 104.

The operation of the conventional electronic fence will now be explained. A user turns on the power switch 103 included in the transmitter 100 and operates the shock level control 101 of the transmitter 100 to set the level of the electric shock to be applied to the animals. In addition, the user operates the transmitter power level control 104 to set a predetermined transmitter power level. Then, the transmission wire antenna 110, included in the electronic fence to prevent the animals from escaping, is operated to generate a signal.

In this state, when an animal wearing a receiver approaches the fence, a receiving antenna receives the signal transmitted from the transmitter 100 and a detector demodulates the received signal into the original signal. When the demodulated signal is an electric shock, the receiver generates a electric shock, having the level corresponding to the level of the transmitted signal, through a pair of electrodes. Accordingly, the animal cannot get out of the transmission wire antenna 110.

However, the aforementioned electronic fence generates an electric shock having a constant level when the animal escapes from a restricted area, and thus it is not efficient. Furthermore, the electric shock is generated when the escaped animal returns to the restricted area. Thus, the animal cannot enter the electronic fence due to the electric shock and the animal may run away.

When excited, some animals can run at speeds up to 100 Km/hour (62 miles/hour). At these speeds, the animal can escape the restricted area before an electric shock is applied to them. Furthermore, when the animals calm down and return home they typically return at a much slower pace. The conventional electronic fence cannot detect the direction the animals are moving relative to the restricted area and will generated the electronic shock as the animals attempt to enter the restricted area. If an electric shock is given to the animals when they are returning to the restricted area, the animals are deterred from entering the conventional electronic fence and may run away and become lost or injured in car accidents.

BRIEF SUMMARY OF THE INVENTION

Accordingly, the embodiment of the present invention has been made to solve the above problems, and it is an object of the present invention to provide an electronic fence capable of guiding animals under training to return to a predetermined restricted area, which automatically controls an electric shock level in response to the animals' location within the predetermined restricted area thereby efficiently controlling the animals within the predetermined restricted area. The present invention determines the animal's direction of travel relative to a plurality of loop antennas defining an internal and external boundary of the electronic fence so as not to generate an electrical shock when an escaped animal returns to the predetermined restricted area.

To accomplish this, the embodiment of the present invention includes a transmitter, a receiver, and the plurality of loop antennas. The transmitter transmits a plurality of radio frequency (RF) signals over at least a first and a second loop antenna of the plurality of loop antennas such that a plurality of control stimuli are generated in response to the animal's position within the boundary of the predetermined restricted area. The transmitter further generates a plurality of control signals for indicating a selected receiver function, including at least one of a vibration, a high-frequency beep, and a shock. In response to the received control signals, the receiver sets an electric shock level and determines whether or not a high-frequency beep is generated, selectively controls the generation of the electric shock and high-frequency beep, automatically restrains the generation of the electric shock when an escaped animal returns to the predetermined restricted area, and generates an audible alarm and turns position confirming lamps on and off to indicate the location of the animal visually and aurally when an animal escapes from the predetermined restricted area.

The transmitter includes: a power switch for providing power or blocking the supply of power; an AC-DC converter for converting AC power supplied through the power switch into DC power having a predetermined level; a function select switch for selecting a desired receiver function; an electric shock level control for setting the level of the electric shock; a transmitter power level control for controlling a transmitter power level; a frequency output circuit for controlling the transmitter power level under the control of the transmitter power level control; a microprocessor for generating the plurality of control signals that indicate the level set by the electric shock level control and the function selected by the function select switch; an antenna loop confirming lamp, a beep selecting lamp, an electric shock selecting lamp and an automatic selecting lamp for indicating the antenna loop operating state, whether a high-frequency beep is selected, whether the electric shock is selected and whether automatic selection is chosen, respectively, under the control of the microprocessor; a modulation circuit for modulating the plurality of control signals generated by the microprocessor into the RF signals; a loop detecting circuit connected to the modulation circuit to detect a loop error and transmitting the loop error to the microprocessor; and a plurality of loop antennas including at least a first loop antenna and a second loop antenna for radiating the modulated RF signals into space.

The receiver includes: a power supply battery; a power controller for regulating the power supply battery output voltage and supplying the regulated output voltage to the receiver or, when the receiver is not used, automatically blocking the regulated output voltage from being supplied to the receiver; a belt for holding the receiver close to the animal; a plurality of receiving antennas for receiving the RF signals transmitted from one of the plurality of loop antennas of the transmitter; an RF amplifier for amplifying the RF signals received by the plurality of receiving antennas to a predetermined level; a detector for down-converting and demodulating the transmitted RF signals; a microprocessor for selectively generating an electric shock level signal, controlling the power supplied to the receiver, generating a sound driver control signal and a lamp driver control signal; a lamp driver for controlling the operations of the position confirming lamps and the operating lamp in response to the lamp driver control signal output from the microprocessor; an amplifier for amplifying the electric shock level signal operably coupled from the microprocessor to a predetermined level; a high-voltage transformer for producing a high voltage and coupling the high voltage to a plurality of electric shock output terminals to output an electric shock; and a sound driver for controlling the operations of a buzzer and a horn according to the sound driver control signal output from the microprocessor.

The above-referenced description of the summary of the invention captures some, but not all, of the various aspects of the present invention. The claims are directed to some of the various other embodiments of the subject matter towards which the present invention is directed. In addition, other aspects, advantages, and novel features of the invention will become apparent from the following detailed description of the invention when considered in conjunction with the accompanying drawings.

BRIEF DESCRIPTION OF THE SEVERAL VIEWS OF THE DRAWINGS

The above and other objects, features, and advantages of the present invention will be apparent from the following detailed description of the preferred embodiments of the invention in conjunction with the accompanying drawings, in which.

DETAILED DESCRIPTION OF THE INVENTION

Reference will now be made to the preferred embodiments of the present invention, examples of which are illustrated in the accompanying drawings.

Figure 1:
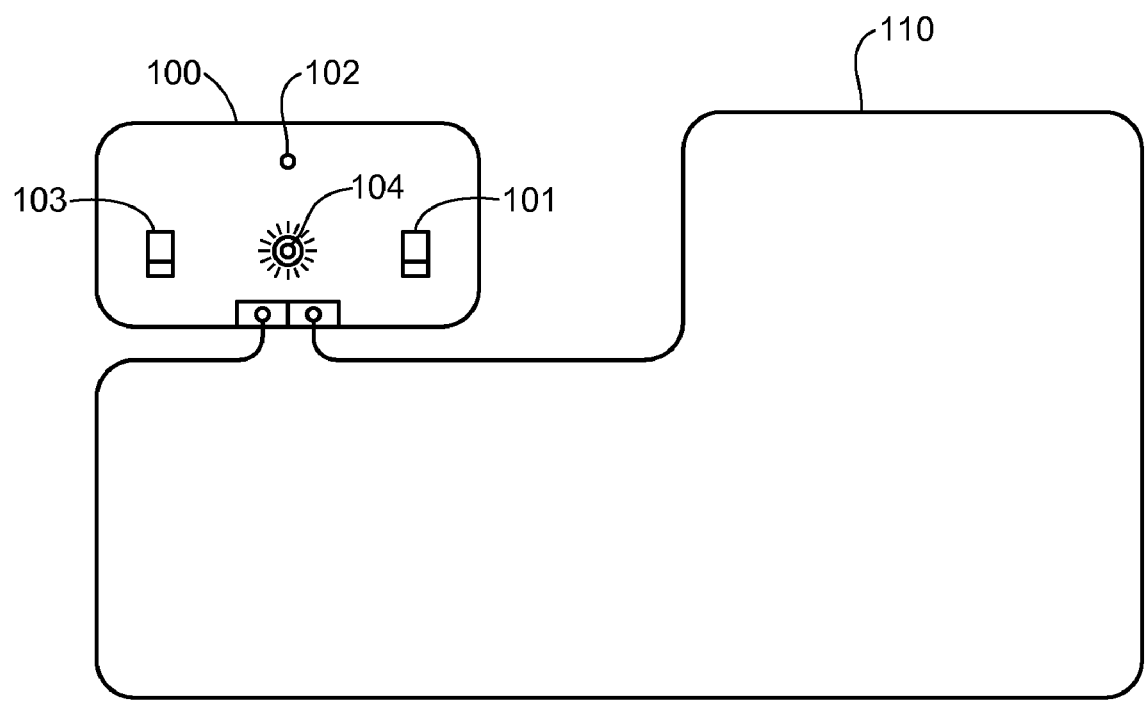
FIG. 1 illustrates a conventional electronic fence.
Figure 2:
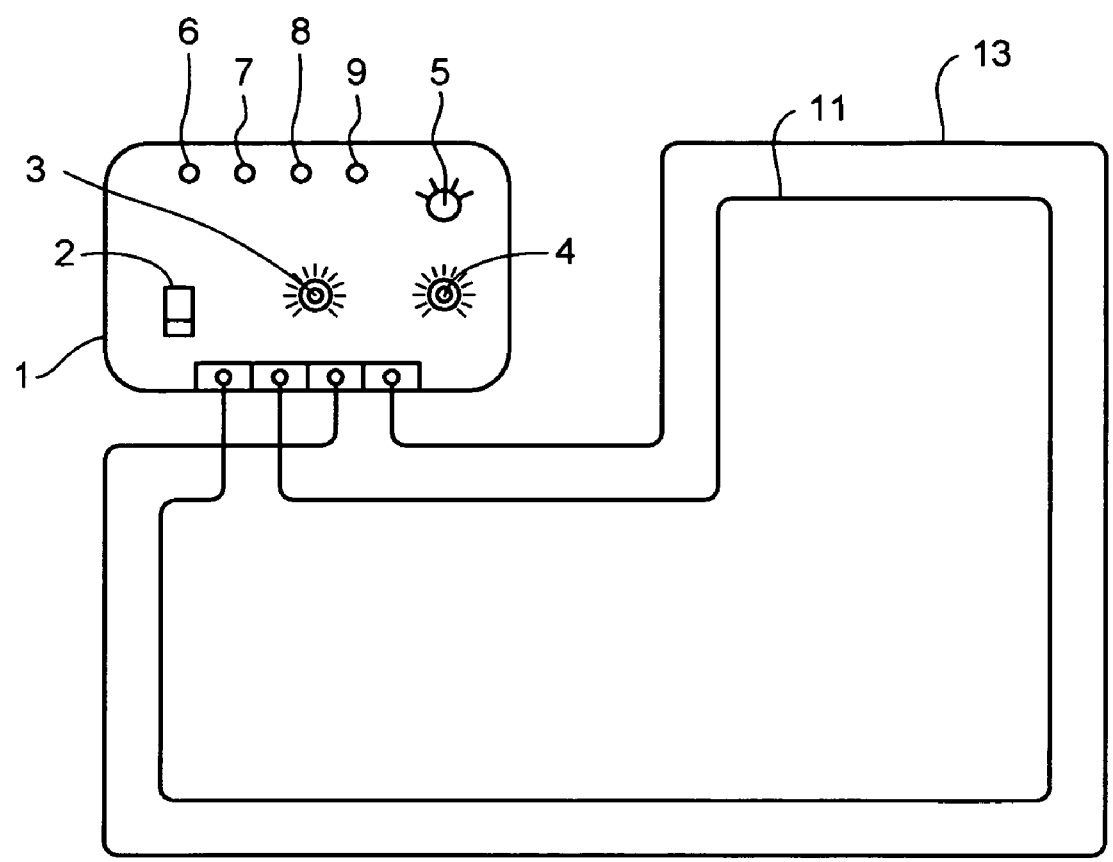
FIG. 2 illustrates a transmitter of the electronic fence according to the present invention.

FIG. 2 illustrates a transmitter 1 of an electronic fence according to the present invention. Transmitter 1 transmits RF signals having a plurality of control signals such that a plurality of control stimuli are generated in response to the position of an animal moving close to the boundary of a predetermined restricted area. In addition, transmitter 1 generates a plurality of control signals for indicating a selected function.

The electronic fence of the present invention includes a power switch 2, a transmitter power level control 3, an electric shock level control 4 for selecting a shock level over a range from zero to full scale, a function select switch 5, an antenna loop confirming lamp 6, a beep selecting lamp 7, an electric shock selecting lamp 8, an automatic selecting lamp 9, and first and second loop antennas 11 and 13, respectively.

Power switch 2 provides power to the transmitter. The transmitter power level control 3 controls a transmitter power level. The electric shock level control 4 sets the level of the electric shock. The function select switch 5 is used to select a desired function: vibration, high-frequency beep, vibration with high-frequency beep, and shock. The antenna loop confirming lamp 6 illuminates to indicate that one of the antenna loops has an error, and a beep selecting lamp 7 indicates whether a high-frequency beep is selected or not. The electric shock selecting lamp 8 and automatic selecting lamp 9 indicate whether the electric shock is selected and whether automatic selection is chosen, respectively.

Figure 3A:
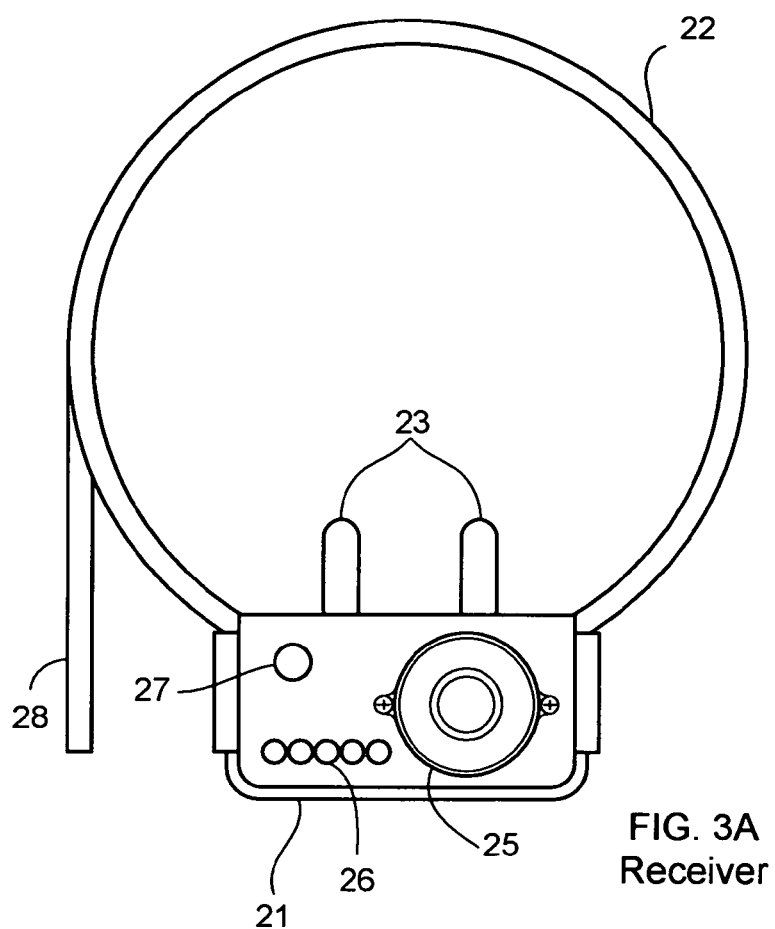
FIGS. 3A and 3B illustrate a receiver of the electronic fence according to the present invention.
Figure 3B:
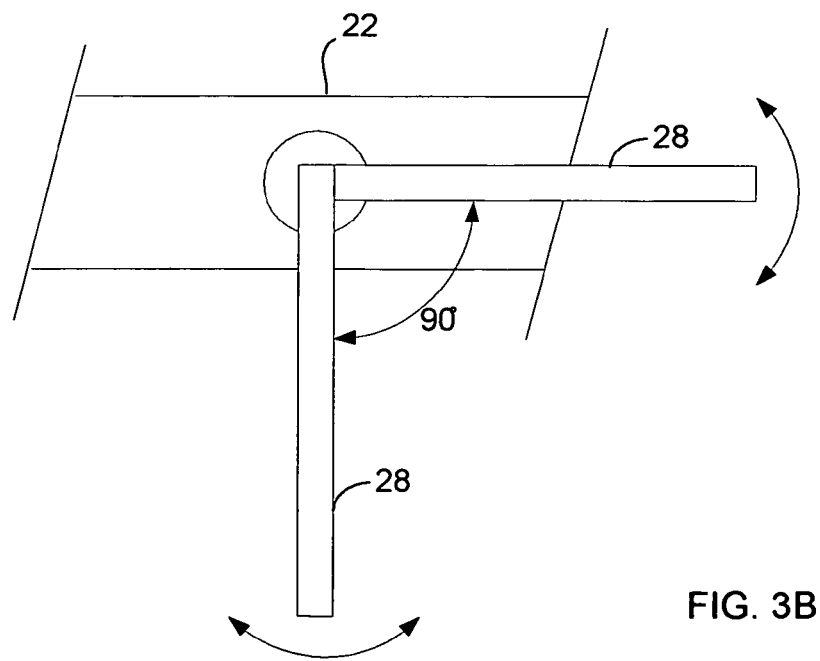

FIG. 3A illustrates receiver 21 of the electronic fence according to the present invention. Receiver 21 includes a belt 22 to connect receiver 21 to the animal, a plurality of electric shock output terminals 23, a buzzer 24 (internal to receiver 21 thus not shown), a horn 25, position confirming lamps 26, and an operating lamp 27. The receiver 21, in response to the RF signals transmitted from the transmitter (transmitter 1 of FIG. 2), selectively controls the generation of the electric shock, vibration, and high-frequency beep. In addition, receiver 21 automatically restrains the generation of the electric shock when an escaped animal returns to the predetermined restricted area and, when an animal escapes from the predetermined restricted area, generates the audible alarm and turns the position confirming lamps on and off to indicate the location of the animal both visually and aurally. FIG. 3B illustrates a side view of receiver 21 and of collar 22. Specifically, FIG. 3B illustrates one embodiment of the invention with a set of orthogonal receiving antennas 28. As may also be seen, orthogonal antennas 28, in one embodiment, are operable to rotate as a unit about a pivot point where the antennas couple to the collar 22 of receiver 21. In operation, the orthogonal antennas are rotated about the pivot point to facilitate the receiver 21 determining relative location of the animal with respect to at least two radiating loops of the electronic fence to facilitate the ability of logic to determine whether a dog is entering or exiting the areas defined by the loop(s) of the electronic fence or, more generally, the location of the animal for all purposes described herein.

Figure 4:
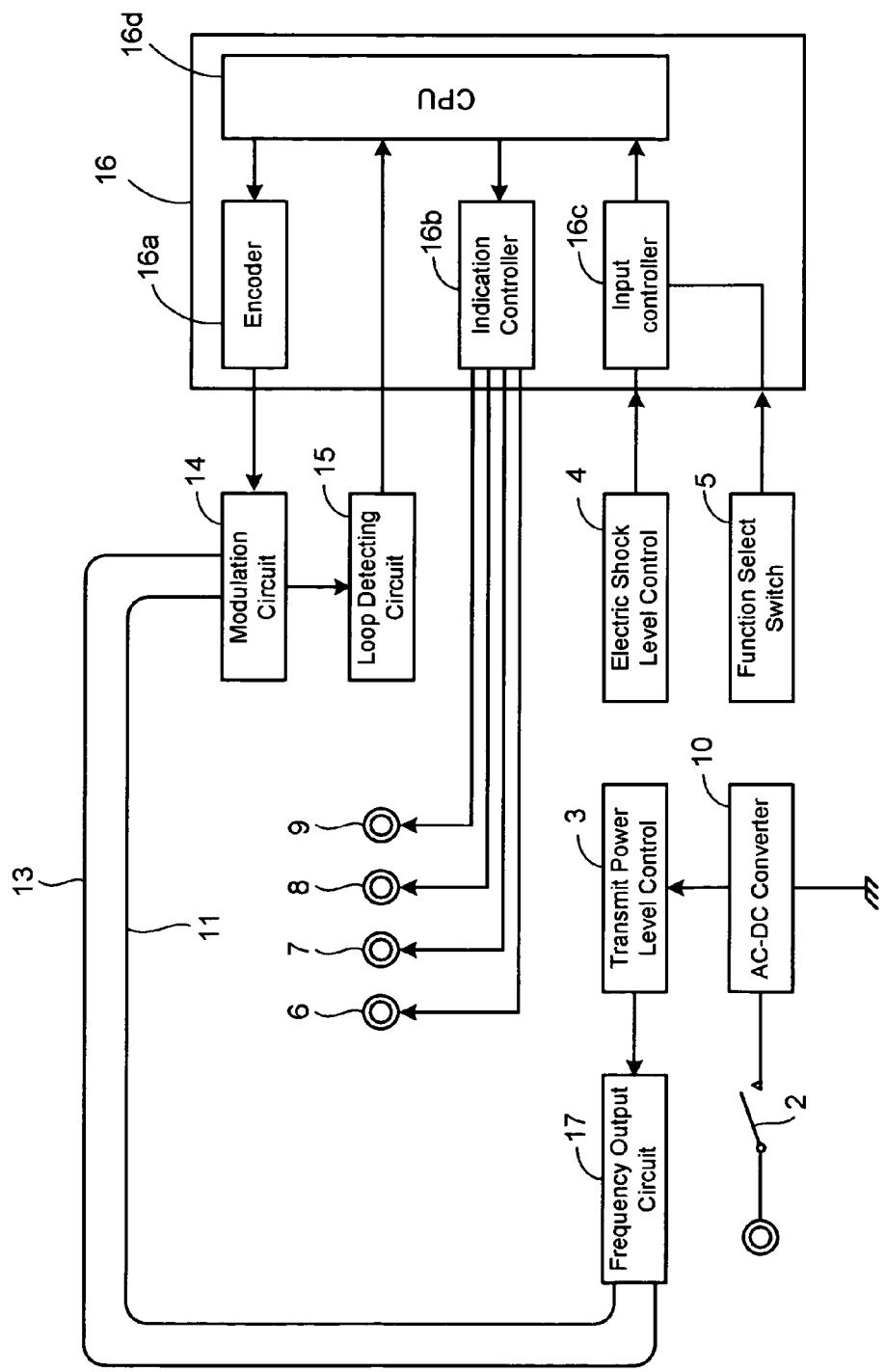
FIG. 4 is a schematic block diagram of the transmitter of the electronic fence according to the present invention.

FIG. 4 is a schematic block diagram of the transmitter of the electronic fence according to the present invention. Transmitter 1 includes a power switch 2, a transmitter power level control 3, a electric shock level control 4, a function select switch 5, an antenna loop confirming lamp 6, a beep selecting lamp 7, an electric shock selecting lamp 8, an automatic selecting lamp 9, an AC-DC converter 10, a first loop antenna 11, a second loop antenna 13, a modulation circuit 14, a loop detecting circuit 15, a microprocessor 16, and a frequency output circuit 17.

When power switch 2 is turned on, AC-DC converter 10 converts input AC power into DC power at a predetermined level and supplies the DC power to the transmitter.

When the microprocessor 16 is provided with DC power, it initializes the circuits of transmitter 1 and then places the transmitter into a transmit state in which the transmitter transmits a plurality of RF signals to the receiver (receiver 21 of FIG. 3). In this transmit state, when a user operates electric shock level control 4 for setting the electric shock level, a corresponding electric shock level control signal is sent to a central processing unit (CPU) 16d of microprocessor 16 through an input controller 16c. Subsequently, when the user operates function select switch 5 to select one of vibration only, high-frequency beep only, vibration and high-frequency beep, or shock, a corresponding function select control signal is sent to CPU 16d of microprocessor 16 through input controller 16c and a function lamp, (i.e., beep selecting lamp 7, electric shock selecting lamp 8, and automatic selecting lamp 9) is turned on in response to the selected function so that the user can easily recognize the selected function.

CPU 16d of microprocessor 16 stores the plurality of control signals until it determines that function selection is complete. At this time, CPU 16d operably couples the plurality of control signals to encoder 16a. The encoder arranges the plurality of control signals into serial data signal suitable for transmission having a start signal, an address signal, function key data, electric shock level data, and a stop signal. Encoder 16a operably couples the serial data signal to modulation circuit 14 when microprocessor 16 determines that the user's operation is completed. Stated differently, microprocessor 16 encodes the plurality of control signals into the serial data signal when the user has completed adjustment of one of the function select switch, the electric shock level control, and the transmitter power level control.

Modulation circuit 14 modulates the serial data signal into RF signals using a local oscillation frequency, as is known to one of average skill in the art. The RF signals are radiated into space through the first loop antenna 11 and second loop antenna 13. The loop detecting circuit 15 is operably coupled to modulation circuit 14 and detects when the loop antenna is not working properly or not connected. When an error is detected, loop detecting circuit 15 sends a signal microprocessor 16 in order to halt transmitter operation. Microprocessor 16 responds by turning on antenna loop confirming lamp 6.

Figure 5:
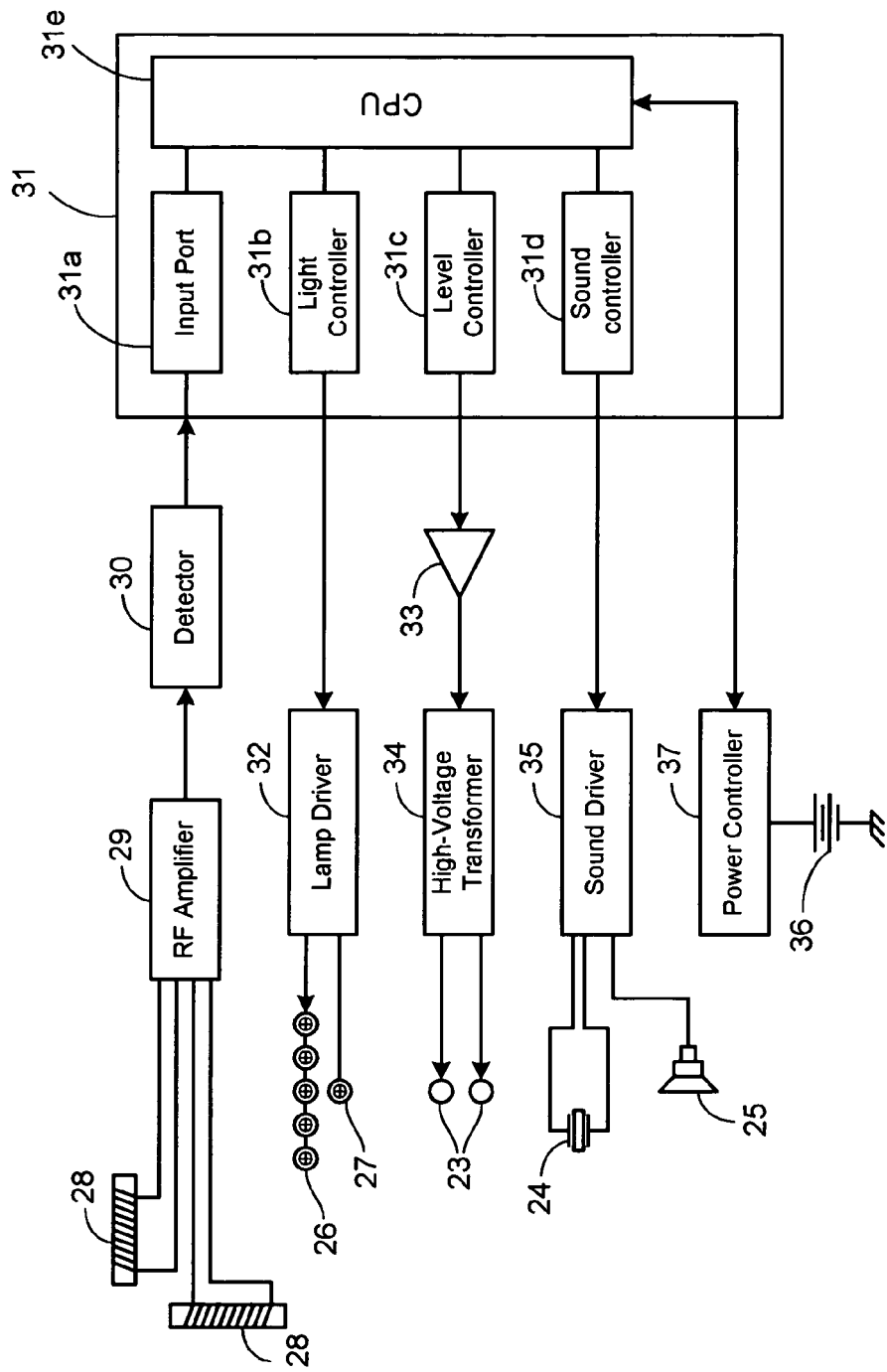
FIG. 5 is a schematic block diagram of the receiver of the electronic fence according to the present invention.

FIG. 5 is a schematic block diagram of the receiver of the electronic fence according to the present invention. Receiver 21 includes a power supply battery 36, a power controller 37, a plurality of receiving antennas 28, a RF amplifier 29, a detector 30, a microprocessor 31, a lamp driver 32, an amplifier 33, a high-voltage transformer 34, and a sound driver 35. Microprocessor 31 includes an input port 31a, a light controller 31b, a level controller 31c, a sound controller 31d, and a central processing unit (CPU) 31e.

The power controller 37 regulates the output voltage of the power supply battery 36 and supplies the regulated voltage to the receiver. When the receiver is not used for a period of time, power controller 37 automatically limits the power supplied to the receiver to conserve power. The plurality of receiving antennas 28 receives the RF signals transmitted from the transmitter (transmitter 1 of FIG. 2). At least two of the plurality of receiving antennas 28 are positioned at right angles (90 degrees) to each other. This allows receiver 21 to determine the animals approach to the electronic fence from any direction, i.e., increases the receiver sensitivity to the first and second loop antennas of the transmitter (transmitter 1 of FIG. 2). RF amplifier 29, operably coupled to receive the RF signals from the plurality of receiving antennas 28, amplifies the RF signals to a predetermined level. The amplified RF signals are operably coupled to detector 30 that down-converts and demodulates the RF signals into the original serial data signal, as is known by one of average skill in the art. Detector 30 operably couples the demodulated serial data signal to input port 31a of microprocessor 31. Input port 31a decodes the demodulated serial data signal into the original start signal, address signal, function key data, shock wave level data, and stop signal and produces the function key data and shock wave level data to CPU 31e for processing.

CPU 31e, in response to the shock wave level control data, selectively generates a parallel bit word to level controller 31c that converts the parallel bit word into the electric shock level signal that is produced to amplifier 33. Amplifier 33 amplifies the electric shock level signal to the predetermined level. The high-voltage transformer 34 boosts the amplified electric shock level signal coupled from amplifier 33 to the high voltage and couples the high voltage to the plurality of electric shock output terminals 23 to produce the electric shock.

CPU 31e of microprocessor 31 selectively controls the power supplied to the receiver by power controller 37, generates the sound driver control signal, and the lamp driver control signal in response to the function key data operably coupled from input port 31a. Lamp driver 32 controls the operation of a position confirming lamp 26 that turns on and off when the animal escapes and an operating lamp 27 that indicates the receiver is operating normally. Sound driver 35 controls the operations of a buzzer 24 and a horn 25 according to the sound driver control signal operably coupled from microprocessor 31 via sound controller 31d. Buzzer 24 produces a vibration that is used as a warning signal to control the animal when it approaches the first loop antenna. The vibration may be used alone or may be used in conjunction with the electric shock and high-frequency beep to control the animal.

When the RF signals radiated through the transmitter first and second loop antennas (first loop antenna 11 and second loop antenna 13 of FIG. 2) are received by the plurality of receiving antennas 28, the function key data are received and processed by receiver 21 that generates one of the lamp driver control signal, the electric shock level signal, and the sound driver control signal when an animal wearing receiver 21 approaches the first or second loop antenna (first loop antenna 11 and second loop antenna 13 of FIG. 2).

In the operation of the electronic fence, microprocessor 31 of receiver 21 receives the output signal of detector 30 to determine whether the receiver has received a signal from the transmitter. Here, the operation of receiver 21 depends on whether the received signal is the output signal of the first loop antenna 11 or the output signal of the second loop antenna 13. For example, when receiver 21 receives the output signal of the first loop antenna 11 first, the receiver judges that an animal is approaching the boundary of the predetermined restricted area in an attempt to get out of the area and operates only the sound driver 35 to generate at least one of the vibration warning through buzzer 24 and the high-frequency beep through the horn 25, depending on the function key data received from the transmitter.

When the animal approaches the boundary of the predetermined restricted area while the vibration is being generated, the microprocessor 31 generates a signal to controller 31C that generates the electric shock level signal sufficient for a low level electric shock. The electric shock level signal is amplified by the amplifier 33 to the predetermined level and then operably coupled to high-voltage transformer 34. High-voltage transformer 34 boosts the amplified signal to a high voltage and applies the high voltage to the plurality of electric shock output terminals 23 such that the low level (i.e., weak) electric shock is generated to stimulate the neck of the animal. Accordingly, as long as the animal does not continue to move forward toward the predetermined restricted area then the generated electric shock is weak.

If the animal continues to move forward toward the predetermined restricted area even when the weak electric shock is being generated, the receiver will receive a signal from the second loop antenna 13. In this condition, the microprocessor 31 generates the electric shock level signal for a high level shock based on the setting of the transmitter electric shock level control. Level controller 31c generates a high level electric shock level signal that is amplified by amplifier 33 to the predetermined level and then operably coupled to high-voltage transformer 34. High-voltage transformer 34 boosts the amplified signal to a high voltage suitable to generate the high level shock and applies the high voltage to the plurality of electric shock output terminals 23 such that a high level electric shock is generated to stimulate the neck of the animal. Accordingly, the animal is stimulated to move away from the second loop antenna and thus remain within the predetermined restricted area. In one embodiment of the invention, the first (inner) loop antenna is positioned a specific distance of approximately two yards from the second (outer) loop antenna. Further, the full scale level of electric shock is 1500 volts in one embodiment of the invention based upon transmissions from the second loop antenna.

When receiver 21 receives the signal of the second loop antenna (second loop antenna 13 of FIG. 2) and then receives the signal of the first loop antenna (first loop antenna 11 of FIG. 2), the receiver determines that the escaped animal is attempting to return to the predetermined restricted area so receiver 21 restrains the generation of the electric shock and the audible alarm. When the receiver no longer receives the signal of the first loop antenna, the receiver determines that the animal has returned to the predetermined restricted area, stops the generation of the electric shock and the audible alarm signal, and returns to its initial state.

However, when the receiver no longer receives the signal of the second loop antenna after first receiving the signal of the second loop antenna and the animal is receiving the strongest electric shock, the receiver 21 judges that the animal has escaped from the predetermined restricted area and operates horn 25 through the sound driver 35 to generate a loud sound so that the user can aurally confirm the location of the animal. Additionally, when microprocessor 31 determines that the animal has escaped, it sequentially illuminates position confirming lamps 26 to assist the owner in locating the animal.

When the escaped animal returns to the predetermined restricted area and the receiver again receives the signal of the second loop antenna, the receiver restrains the generation of the electric shock and the alarm signal such that the animal can return to a position within the predetermined restricted area.

Additionally, microprocessor 31 checks an inactivity timer using an internally stored program. Specifically, the microprocessor 31 starts counting time from the moment the receiver is last used. When the counted time exceeds a predetermined period of time (5 hours, for example), microprocessor 31 automatically generates a power controller signal to power controller 37. Power controller 37 reduces the output voltage to receiver 21 to reduce power consumption.

The embodiment of the present invention includes a luminous reflection belt (belt 22 of FIG. 3) in order to make the escaped animal more visible at night. This reflective belt is helpful in locating the animal. For example, if the battery is out of charge resulting in the audible alarm and position confirming lamps becoming substantially inoperable, the reflective collar facilitates the animal being seen at night from a distance.

As described above, the electronic fence of the present invention sets an electric shock level in response to the position of an animal moving close to the boundary of a predetermined restricted area. Thus, the animal can be restrained from escaping from the predetermined restricted area without giving an excessive electric shock to the animal. Furthermore, the present invention can generate an extremely loud sound and bright lights through receiver 21 connected to belt 22 the animal wears so that the location of the animal can be easily detected when the animal gets out of the predetermined restricted area. Moreover, the present invention can restrain the generation of electric shock when the escaped animal returns to the predetermined restricted animal and thus the animal can come back safely.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims.

What is claimed is:

1. An electronic fence system capable of guiding animals to return, comprising:

a transmitter for generating radio frequency (RF) signals;

a plurality of loop antennas, defining a boundary of a predetermined restricted area, for radiating the RF signals into space wherein the plurality of loop antennas includes at least a first loop antenna and a second loop antenna defining an internal and external boundary, respectively, of the predetermined restricted area and further wherein the first loop antenna is positioned a specified distance inside the second loop antenna;

wherein the transmitter is operable to select between a plurality of functions and to generate a control command specifying at least one of vibration, high-frequency beep, vibration with high frequency beep, shock and shock intensity wherein the transmitter includes:

a power switch for selectively providing and blocking power to the transmitter;

an AC-DC converter for converting AC power supplied through the power switch into DC power having a predetermined level;

a function select switch for selecting a desired receiver function;

an electric shock level control for setting a level of an electric shock;

a transmitter power level control for controlling a transmitter power level;

a frequency output circuit for controlling said transmitter power level under the control of the transmitter power level control;

a transmitter microprocessor for generating a plurality of control signals defining the operational state of a receiver;

an antenna loop confirming lamp for indicating an antenna loop operating state;

a beep selecting lamp for indicating a high-frequency beep is selected;

an electric shock selecting lamp for indicating the electric shock is selected;

an automatic selecting lamp for indicating automatic operation is selected;

an encoder for converting the plurality of control signals received from the microprocessor into a serial data signal suitable for transmission;

a modulation circuit for modulating the serial data signal produced by the encoder into the RF signals; and a loop detecting circuit operably coupled to the modulation circuit to detect a transmission loop error and for transmitting the transmission loop error to the microprocessor; and wherein the receiver receives the transmitted RF signals and the control command and initiates a stimulation based upon the control command, the receiver further including a plurality of antennas structurally arranged to define a ninety degree axial orientation relative to each other wherein the receiver is operable to determine the animal's approach to an electronic fence from any direction.

2. The electronic fence system of claim 1, wherein the specified distance is approximately two yards.

3. The electronic fence system of claim 1, wherein the electric shock level control sets the level of the electric shock from zero to full scale.

4. The electronic fence system of claim 3, wherein the full scale level of the electric shock is 1500 volts.

5. The electronic fence system of claim 1, wherein the receiver comprises:
   a belt for holding the receiver in close proximity to the animal;
   wherein the plurality of receiving antennas for receiving the RF signals transmitted from the transmitter are attached to the belt;
   a plurality of electric shock output terminals;
   a horn for sounding a high-frequency beep and an audible alarm;
   a buzzer for generating a vibration; and
   receiver circuitry for processing the transmitted RF signals operably coupled from the plurality of receiving antennas, wherein the receiver circuitry is operably disposed to prompt the horn to sound, the buzzer to generate the vibration, the electric shock terminals to generate the electric shock based upon logic determining that a location of the animal requires one or more of these stimulations.

6. The electronic fence system of claim 5 wherein the belt includes a visible reflective surface.

7. The electronic fence system of claim 5, wherein the receiving circuitry includes:
   a power supply battery;
   a power controller for regulating an output voltage of the power supply battery and for automatically controlling the regulated output voltage to the receiver such that the regulated output voltage is reduced after a period of inactivity;
   an RF amplifier for amplifying the RF signal received by the receiving antenna to a predetermined level;
   a detector for down-converting and demodulating the RF signal coupled from the RF amplifier into the serial data signal;
   a receiver microprocessor for selectively generating a plurality of function control signals, the plurality of function control signals including:
      an electric shock level signal;
      a lamp driver control signal;
      a sound driver control signal;
      a lamp driver for controlling operation of a plurality of lamps;
      an amplifier for amplifying the electric shock level signal to a predetermined level;
      a high-voltage transformer for boosting the amplified electric shock level signal to a high voltage; and
      a sound driver for controlling the operations of the buzzer and the horn according to the sound driver control signal.

8. The electronic fence system of claim 7, wherein the receiver circuitry is operable to:
   set the electric shock level;
   determine whether or not to generate a high-frequency beep in response to the RF signals transmitted from the transmitter;
   selectively control the generation of the electric shock;
   and the level of the electric shock in response to the animal moving close to at least one of the first loop antenna and second loop antenna defining the internal and external boundary of the predetermined restricted area;
   generate auditory and visual signals to indicate the location of the animal when the animal escapes from the predetermined restricted area; and
   restrain the generation of the electric shock when the escaped animal returns to the predetermined restricted area.

9. The electronic fence system of claim 8, wherein the receiver microprocessor:
   causes the sound driver to generate only a high-frequency beep when the receiver receives the RF signal transmitted from the transmitter first loop antenna;
   causes the high-frequency beep and a low level electric shock to be generated when the receiver continuously receives the RF signal transmitted from the transmitter first loop antenna;
   causes a high level electric shock to be generated when the receiver receives the RF signal transmitted from the transmitter first loop antenna and then receives the RF signal transmitted from the transmitter second loop antenna; and
   generates an audible alarm and, simultaneously, turns position confirming lamps on and off based upon whether the receiver receives the RF signal transmitted from the transmitter second loop antenna.

10. The electronic fence system of claim 9 wherein the receiver microprocessor is operable to determine that an escaped animal has returned to the predetermined restricted area and restrains the generation of the electric shock when the receiver receives the RF signal transmitted from the transmitter second loop antenna after receiving the RF signal transmitted from the transmitter second loop antenna and then receiving no other RF signals, or when the receiver receives the RF signal transmitted from the transmitter first loop antenna after receiving the RF signal transmitted from the transmitter second loop antenna.

11. An electronic fence system capable of guiding animals to return, comprising:
   a transmitter for generating radio frequency (RF) signals wherein the transmitter includes:
      a power switch for selectively providing and blocking power to the transmitter;
      an AC-DC converter for converting AC power supplied through the power switch into DC power having a predetermined level;
      a function select switch for selecting a desired receiver function;
      an electric shock level control for setting a level of an electric shock;
      a transmitter power level control for controlling a transmitter power level;
      a frequency output circuit for controlling said transmitter power level under the control of the transmitter power level control;
      a transmitter microprocessor for generating a plurality of control signals defining the operational state of a receiver
      a beep selecting lamp for indicating a high-frequency beep is selected;
      an electric shock selecting lamp for indicating the electric shock is selected; and
      an automatic selecting lamp for indicating automatic operation is selected;

an encoder for converting the plurality of control signals received from the microprocessor into a serial data signal suitable for transmission; and a modulation circuit and transmission circuit for modulating and transmitting the serial data signal produced by the encoder into the RF signals;

a plurality of loop antennas operably coupled to the transmitter, the plurality of loop antennas defining a boundary of a predetermined restricted area, for radiating the RF signals into space wherein the plurality of loop antennas includes at least a first loop antenna and a second loop antenna defining an internal and external boundary, respectively, of the predetermined restricted area and further wherein the first loop antenna is positioned a specified distance inside the second loop antenna;

wherein the receiver receives the transmitted RF signals and the control command and initiates a stimulation based upon the control command, the receiver further including a plurality of orthogonal antennas structurally arranged to define a ninety degree axial orientation relative to each other wherein the receiver is operable to determine the animal's approach to an electronic fence from any direction; and wherein the receiver is operable to trigger different levels of stimulation based upon location of the receiver in relation to the first and second loops and based upon signals received from at least one of the first and second loops through at least one of the plurality of orthogonal antennas.

12. The electronic fence system of claim 11 wherein the transmitter is operable to select between a plurality of functions and to generate a control command specifying at least one of vibration, high-frequency beep, vibration with high frequency beep, shock and shock intensity.

13. The electronic fence system of claim 11 wherein the different levels of stimulation include different types of stimulation.

14. The electronic fence system of claim 11 wherein the different levels of stimulation include different levels of electrical shock for a constant shock level setting of the transmitter.

15. The electronic fence system of claim 14 wherein the electric shock level control sets the level of the electric shock from zero to full scale.

16. The electronic fence system of claim 14 wherein the full scale level of the electric shock is 1500 volts.

17. The electronic fence system of claim 11 wherein the specified distance is approximately two yards.

* * * * *